United States Patent
Earl et al.

(10) Patent No.: US 9,988,915 B2
(45) Date of Patent: Jun. 5, 2018

(54) STATOR SEGMENT

(71) Applicant: UNITED TECHNOLOGIES CORPORATION, Hartford, CT (US)

(72) Inventors: Jonathan J. Earl, Wells, ME (US); Carl S. Richardson, South Berwick, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 483 days.

(21) Appl. No.: 14/776,181

(22) PCT Filed: Mar. 11, 2014

(86) PCT No.: PCT/US2014/023206
§ 371 (c)(1),
(2) Date: Sep. 14, 2015

(87) PCT Pub. No.: WO2014/197042
PCT Pub. Date: Dec. 11, 2014

(65) Prior Publication Data
US 2016/0032742 A1 Feb. 4, 2016

Related U.S. Application Data

(60) Provisional application No. 61/778,930, filed on Mar. 13, 2013.

(51) Int. Cl.
*F01D 9/04* (2006.01)
*F01D 11/00* (2006.01)
*F01D 25/24* (2006.01)

(52) U.S. Cl.
CPC ............... *F01D 9/04* (2013.01); *F01D 9/041* (2013.01); *F01D 11/005* (2013.01);
(Continued)

(58) Field of Classification Search
CPC .......... F01D 9/04; F01D 9/041; F01D 11/005; F01D 25/246
See application file for complete search history.

(56) References Cited

U.S. PATENT DOCUMENTS 3,393,894 A * 7/1968 Redsell ................... F01D 5/225
  277/643
3,999,883 A * 12/1976 Nordenson ........... F01D 17/162
  415/113

(Continued)

FOREIGN PATENT DOCUMENTS

EP 1431517 A2 6/2004
EP 1870563 A1 12/2007
(Continued)

OTHER PUBLICATIONS

Supplementary European Search Report for European Application No. 14807620.1 dated Oct. 17, 2016.

*Primary Examiner* — Woody Lee, Jr.
(74) *Attorney, Agent, or Firm* — Carlson, Gaskey & Olds, P.C.

(57) ABSTRACT

One exemplary embodiment of this disclosure relates to a stator segment. The stator segment includes a first circumferential end face, and a second circumferential end face. Further, the first and second circumferential end faces are misaligned relative to one another.

19 Claims, 4 Drawing Sheets

(52) U.S. Cl.
CPC ........ F01D 25/246 (2013.01); *F05D 2230/51* (2013.01); *F05D 2240/12* (2013.01); *F05D 2240/129* (2013.01); *F05D 2240/57* (2013.01); *F05D 2250/314* (2013.01); *Y02T 50/671* (2013.01)

(56) References Cited

U.S. PATENT DOCUMENTS

| | | | | |
|---|---|---|---|---|
| 4,749,333 | A | * | 6/1988 | Bonner ................ F01D 11/005 277/591 |
| 5,154,577 | A | * | 10/1992 | Kellock ............... F01D 11/005 277/641 |
| 6,179,560 | B1 | * | 1/2001 | Kouris ................... F01D 9/042 415/190 |
| 8,142,148 | B2 | * | 3/2012 | Hernandez ........... F01D 11/005 415/203 |
| 2011/0008163 | A1 | | 1/2011 | Prentice et al. |
| 2012/0128472 | A1 | | 5/2012 | Singh et al. |
| 2013/0011265 | A1 | | 1/2013 | Miller et al. |
| 2016/0319840 | A1 | * | 11/2016 | Riley ..................... F01D 9/041 |

FOREIGN PATENT DOCUMENTS

| | | | |
|---|---|---|---|
| EP | 2586993 | A2 | 5/2013 |
| WO | 2014031196 | A2 | 2/2014 |

\* cited by examiner

STATOR SEGMENT

RELATED APPLICATIONS

This application claims the benefit of U.S. Provisional Application No. 61/778,930, filed Mar. 13, 2013, the entirety of which is herein incorporated by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Both the compressor and turbine sections include alternating arrays of rotating blades and stator vanes that extend into a core airflow path of the gas turbine engine. Adjacent arrays of stator vanes may be grouped together, in one example, by welding individually cast arrays to form a segment known as a "stack." Seals, such as featherseals, are provided between the arrays to prevent leakage from the core airflow path.

SUMMARY

One exemplary embodiment of this disclosure relates to a stator segment. The stator segment includes a first circumferential end face, and a second circumferential end face. Further, the first and second circumferential end faces are misaligned relative to one another.

In a further embodiment, a first featherseal slot is defined in the first circumferential end face.

In a further embodiment of any of the above, a second featherseal slot is defined in the second circumferential end face.

In a further embodiment of any of the above, a longitudinal axis of the first featherseal slot is misaligned relative to a longitudinal axis of the second featherseal slot.

In a further embodiment of any of the above, the longitudinal axis of the first featherseal slot is defined at a first angle relative to a reference axis, and the longitudinal axis of the second featherseal slot is defined at a second angle relative to the reference axis, the second angle greater than the first angle.

In a further embodiment of any of the above, the stator segment further includes a first featherseal within the first featherseal slot, and a second featherseal within the second featherseal slot.

In a further embodiment of any of the above, the stator segment includes a radially outer platform defining a bleed slot, and the first featherseal slot extends from a first axial end of the stator segment to the bleed slot, and the second featherseal slot extends from the bleed slot to a second axial end of the stator segment.

In a further embodiment of any of the above, the stator segment further includes a plurality of stator vanes supported by the radially outer platform. Further, the stator segment is part of a gas turbine engine and the plurality of stator vanes are operatively disposed within a core airflow path of the gas turbine engine.

Another exemplary embodiment of this disclosure relates to a section of a gas turbine engine. The engine includes a first stator segment having a first circumferential end face and a second circumferential end face misaligned relative to one another. Further included is a second stator segment having a first circumferential end face and a second circumferential end face misaligned relative to one another. A first featherseal is between the first circumferential end faces of the first and second stator segments, and a second featherseal is between the second circumferential end faces of the first and second stator segments.

In a further embodiment of any of the above, the first featherseal is disposed in slots defined in the first circumferential end faces of the first and second stator segments.

In a further embodiment of any of the above, the second featherseal is disposed in slots defined in the second circumferential end faces of the first and second stator segments.

In a further embodiment of any of the above, longitudinal axes of the slots in which the first featherseal is disposed are defined at a first angle relative to an engine longitudinal axis of the gas turbine engine, and the longitudinal axes of the slots in which the second featherseal is disposed are provided at a second angle relative to the engine longitudinal axis, the second angle greater than the first angle.

In a further embodiment of any of the above, longitudinal axes of the slots in which the first featherseal is disposed are misaligned relative to longitudinal axes of the slots in which the second featherseal is disposed.

In a further embodiment of any of the above, the first and second stator segments each include a radially outer platform with a bleed slot formed therein.

In a further embodiment of any of the above, the slots having the first featherseal disposed therein extend from a first axial end of the respective stator segment to the corresponding bleed slot.

In a further embodiment of any of the above, the slots having the second featherseal disposed therein extend from a second axial end of the respective stator segment to the corresponding bleed slot.

In a further embodiment of any of the above, the section is one of a compressor section and a turbine section.

Still another exemplary embodiment of this disclosure relates to a gas turbine engine. The engine includes a compressor section, a combustor section, and a turbine section. Further, a stator segment is provided within one of the compressor section and the turbine section. The stator segment includes a first circumferential end face and a second circumferential end face. The first and second circumferential end faces are misaligned relative to one another.

In a further embodiment of any of the above, the first circumferential end face defines a first featherseal slot configured to receive a first featherseal, and the second circumferential end face defines a second featherseal slot configured to receive a second featherseal.

In a further embodiment of any of the above, the stator segment includes a radially outer platform, and a plurality of stator vanes supported by the radially outer platform within a core airflow path of a gas turbine engine.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
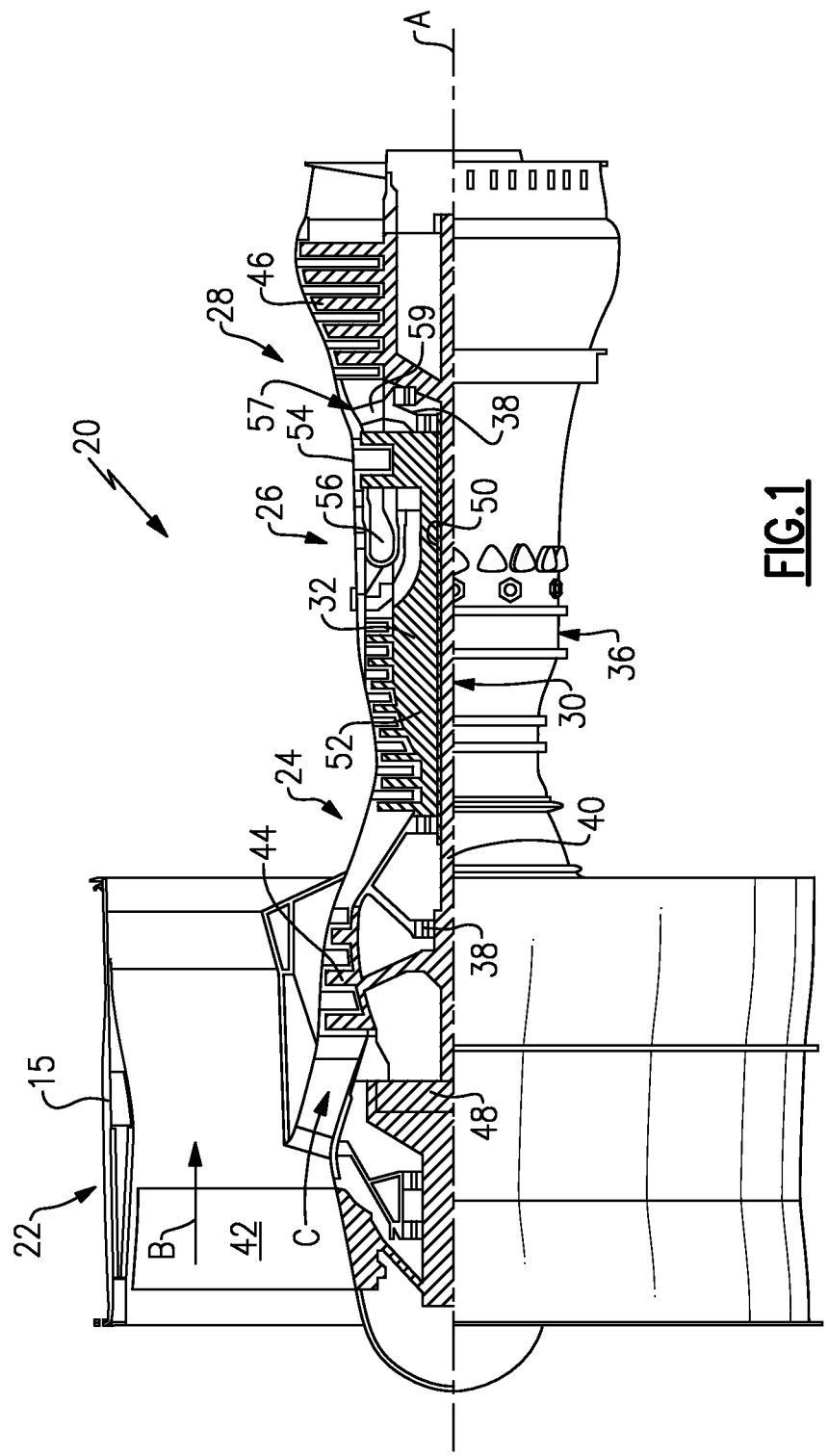
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
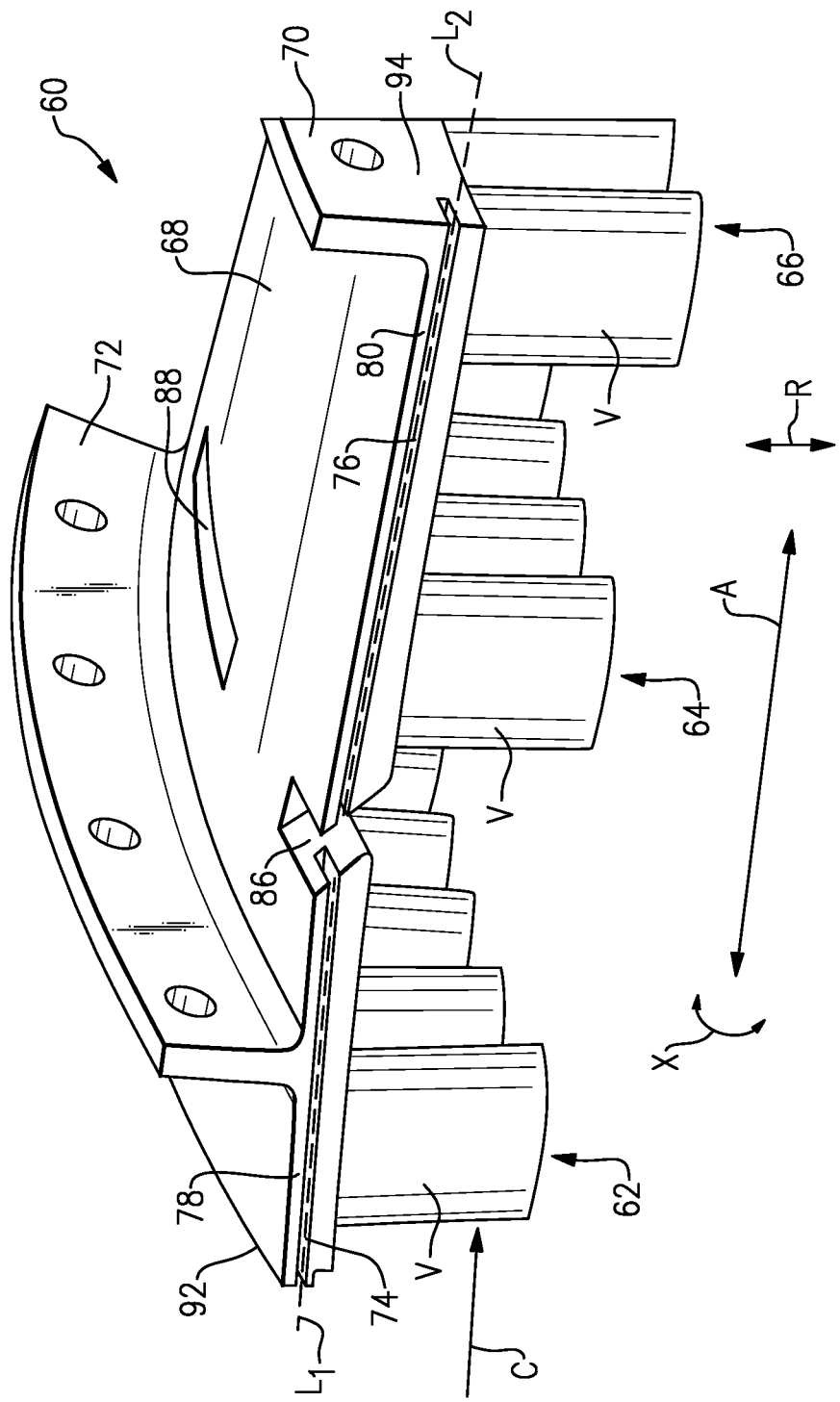
FIG. 2 is a perspective view of a portion of a stator segment.

FIG. 2 illustrates an example stator segment for supporting a plurality of stator vanes V, otherwise known as a "stack" 60. The stack 60 may be provided in either the compressor section 24, the turbine section 28, or some other area of the engine 20. The stack 60, in this example, is formed integrally with three arrays 62, 64, 66 of stator vanes V, such as by casting. The stack 60 may be formed in other ways, however.

The arrays 62, 64, 66 are axially spaced apart from one another (along the engine central longitudinal axis A). The individual vanes V within the arrays 62, 64, 66 are circumferentially spaced apart from one another. Because the stack 60 includes three arrays 62, 64, 66 of vanes V, the stack 60 may be referred to as a "triple stack." While a triple stack is illustrated, it should be understood that this disclosure extends to stacks having a different number of arrays of vanes. For example, this disclosure extends to double stacks, as well as quadruple stacks.

The stack 60 includes an outer platform 68. The vanes V extend radially (e.g., in the radial direction R) inward from the outer platform 68 into the core airflow path C. The outer platform 68 in this example includes first and second flanges 70, 72 for mounting and orienting the stack 60 relative to the engine 20.

The outer platform 68 is arranged such that the stack 60 can be positioned circumferentially (relative to the circumferential direction X) adjacent a similar stack. Together, an array of adjacent stacks forms a substantially continuous loop about the engine central longitudinal axis A. In order to prevent unwanted leakage from the core airflow path C, spaces between adjacent stacks are sealed, as explained below.

Figure 4:
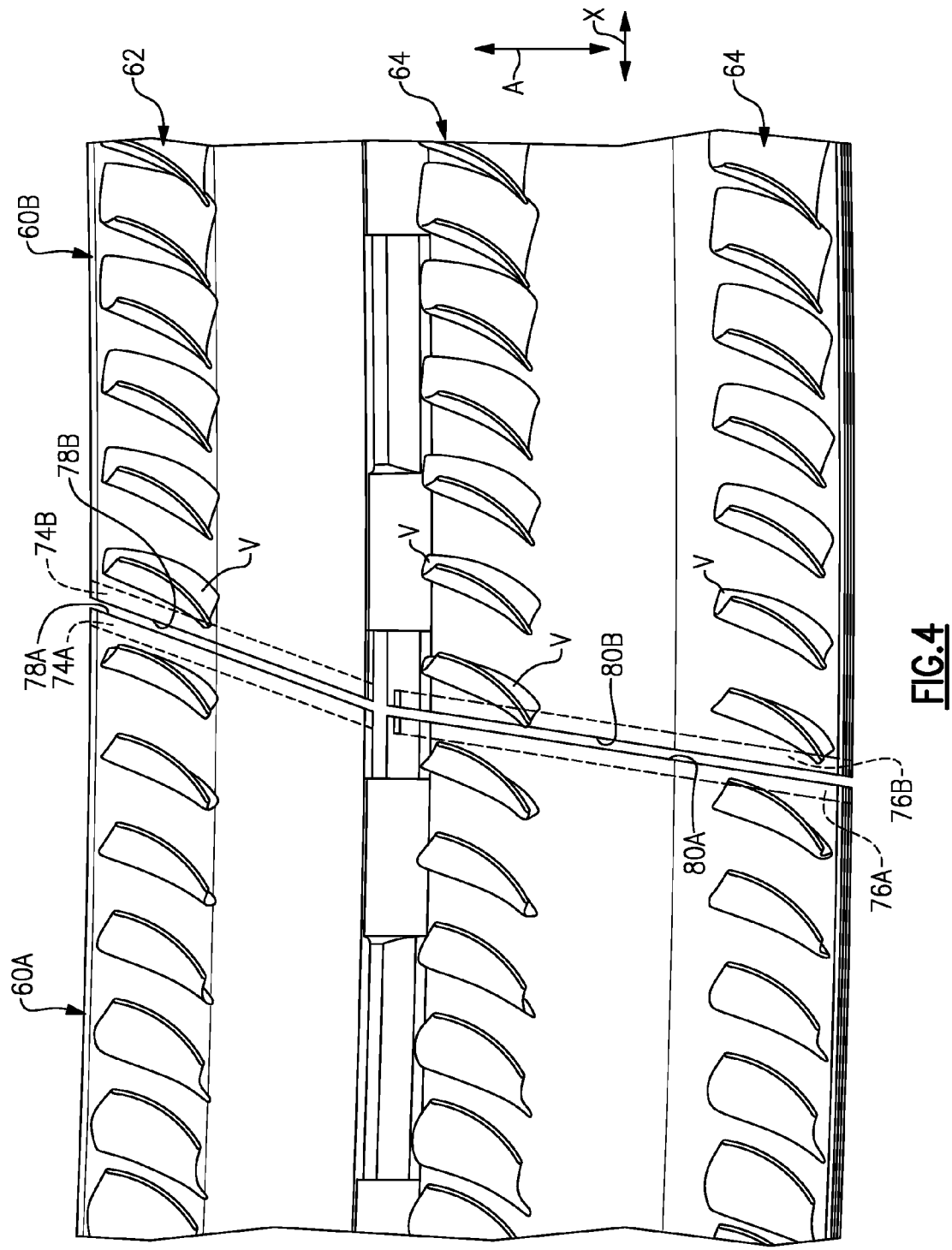
FIG. 4 is a view of two stator segments side-by-side from a radially inner perspective.

In the illustrated example, the stack 60 includes first and second featherseal slots 74, 76. FIG. 2 only illustrates one side of the stack 60. It should be understood that the opposite circumferential side of the stack 60 would also include first and second featherseal slots, which would be oriented as generally illustrated in FIG. 4.

With continued reference to FIG. 2, the first featherseal slot 74 is formed in a first circumferential end face 78 of the outer platform 68, and the second featherseal slot 76 is formed in a second circumferential end face 80 of the outer platform 68. As illustrated, each of the first and second slots 74, 76, are relatively straight, and are configured to receive a rectangular featherseal, although other featherseal shapes can be used.

Figure 3:
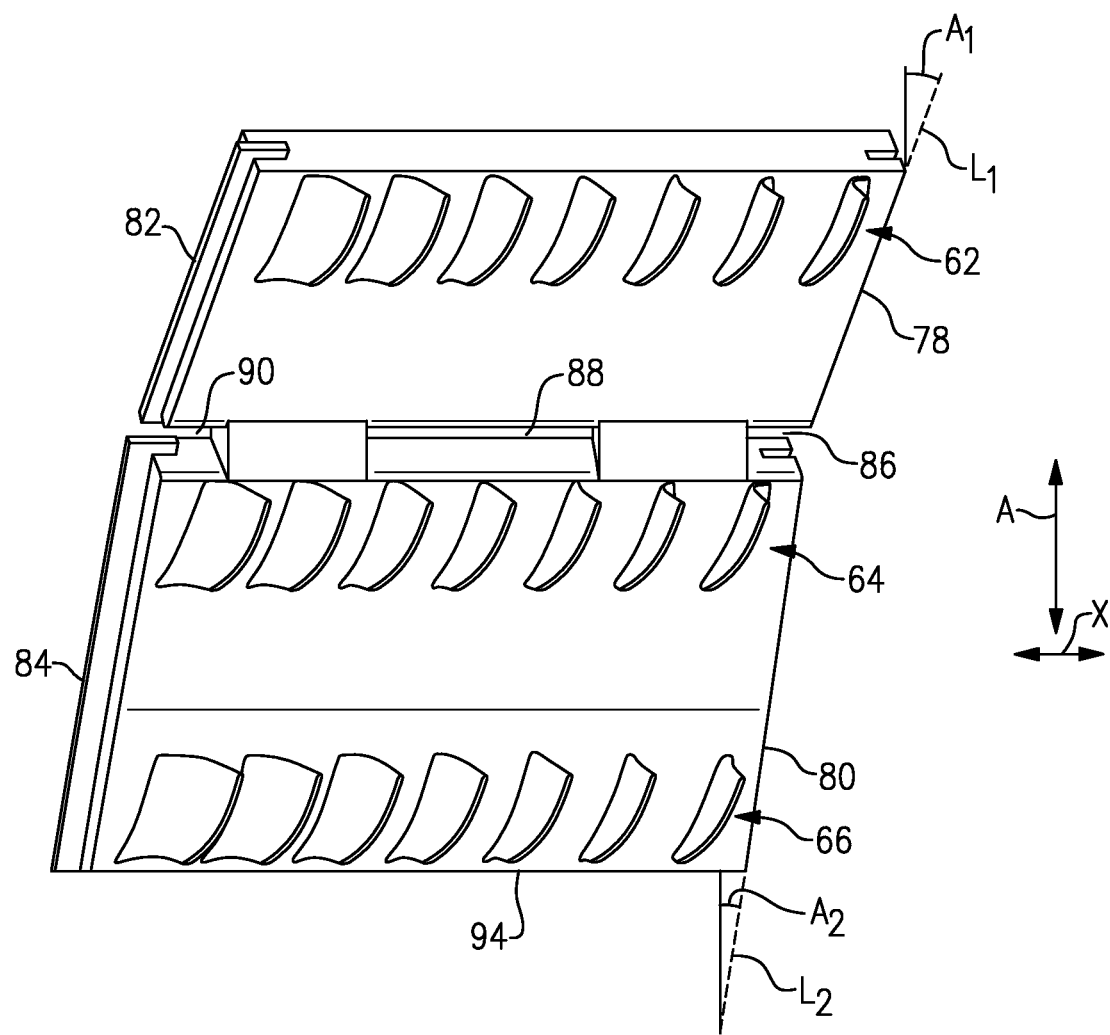
FIG. 3 is a view of the stator segment of FIG. 2 from a radially inner perspective.

Referring to FIG. 3, the first and second circumferential end faces 78, 80 are misaligned relative to one another. While the stack 60 includes two misaligned circumferential end faces 78, 80, other examples can include additional split angles (and corresponding featherseals). For instance, the stack 60 could include three misaligned circumferential faces, in which case three separate featherseals would be provided.

The misalignment between the first and second circumferential end faces 78, 80 provides a corresponding misalignment between the first and second featherseal slots 74, 76. For instance, the first featherseal slot 74 extends along a longitudinal axis $L_1$, which is provided at a first angle $A_1$ relative to the engine central longitudinal axis A. The first angle $A_1$ is different (and, in this example, larger) than a second angle $A_2$ established between a longitudinal axis $L_2$ of the second featherseal slot 76 and the engine central longitudinal axis A. While the engine central longitudinal axis A is shown as an example, the longitudinal axes $A_1$, $A_2$, could be misaligned relative to another reference axis.

In this example, two separate, relatively straight featherseals can be provided within the slots 74, 76, and provide effective sealing between adjacent stacks. Example featherseals are illustrated at 82 and 84 in FIG. 3.

In some examples, the stack 60 includes a plurality of bleed slots 86, 88, 90. These bleed slots 86, 88, 90 allow fluid to bleed from the core airflow path C. This bled fluid can be routed within the engine 20 as needed. The bleed slots 86, 88, 90 can be used advantageously to facilitate machining of the featherseal slot 74, 76.

For instance, with reference to FIG. 2, the first featherseal slot 74 extends from a first axial end 92 of the stack 60 to the bleed slot 86. The second featherseal slot 76, on the other hand, extends from the bleed slot 86 to a second axial end 94 of the stack 60. The bleed slots 86, 88, 90 help simplify part geometry while maintaining adequate sealing.

In one example, the featherseal slots 74, 76 are formed using electron discharge machining (EDM). In this example, an EDM electrode or wire can project into the bleed slot 86 and be moved axially toward one of the ends 92, 94 to form the featherseal slots 74, 76. While EDM has been mentioned, the featherseal slots 74, 76 can be formed using other machining techniques.

FIG. 4 illustrates two stacks 60A, 60B provided circumferentially adjacent one another, and is representative of the arrangement of adjacent stacks 60 within the engine 20. As illustrated, the stack 60A includes a first circumferential end face 78A arranged circumferentially adjacent to a first circumferential end face 78B of the adjacent stack 60B. Additionally, the stack 60A has a second circumferential end face 80A provided adjacent a second circumferential end face 80B of the stack 60B. Featherseals would be supported in slots 74A, 74B, 76A, 76B (shown in phantom) formed in the circumferential end faces 78A, 78B, 80A, 80B, such that the featherseals span the space between the adjacent circumferential end faces.

As can be seen in FIG. 4, providing a single, relatively straight featherseal slot that extends through each of the arrays 62, 64, 66 without interrupting the vanes V can be challenging. This is due to, among other things, the differing counts of vanes V per array, as well as the high angle chord of vanes V. The misaligned circumferential end faces 78A, 78B, 80A, 80B are angled in a way that does not interrupt the vanes V. Further, providing two relatively straight featherseal slots 74, 76 is simpler to machine than a curved or non-straight design.

This disclosure provides, among other benefits, a relatively light weight stator design by eliminating the need to hang each stator stage from separate flanges. In particular, it allows the architecture to use less bolted flanges, which means less hardware.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "relatively," "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A stator segment, comprising:
   a radially outer platform supporting a first stage of vanes and a second stage of vanes downstream of the first stage of vanes;
   a first circumferential end face, wherein a first featherseal slot is defined in the first circumferential end face; and
   a second circumferential end face, wherein the first and second circumferential end faces are misaligned and axially spaced-apart relative to one another, wherein a second featherseal slot is defined in the second circumferential end face, and wherein a longitudinal axis of the first featherseal slot is misaligned relative to a longitudinal axis of the second featherseal slot.

2. The stator segment as recited in claim 1, wherein the longitudinal axis of the first featherseal slot is defined at a first angle relative to a reference axis, and the longitudinal axis of the second featherseal slot is defined at a second angle relative to the reference axis, the second angle greater than the first angle.

3. The stator segment as recited in claim 1, further comprising:
   a first featherseal within the first featherseal slot; and
   a second featherseal within the second featherseal slot.

4. The stator segment as recited in claim 1, wherein the radially outer platform defining a bleed slot, and wherein the first featherseal slot extends from a first axial end of the stator segment to the bleed slot, and wherein the second featherseal slot extends from the bleed slot to a second axial end of the stator segment.

5. The stator segment as recited in claim 4, wherein the first stage of vanes and the second stage of vanes are operatively disposed within a core airflow path of the gas turbine engine.

6. The stator segment as recited in claim 1, wherein the first stage of vanes is axially aligned with the first circumferential end face and the second stage of vanes is axially aligned with the second circumferential end face.

7. A section of a gas turbine engine, comprising:
a first stator segment having a first circumferential end face and a second circumferential end face misaligned and axially spaced-apart relative to one another, the first stator segment including a radially outer platform supporting a first stage of vanes and a second stage of vanes downstream of the first stage of vanes;
a second stator segment having a first circumferential end face and a second circumferential end face misaligned and axially spaced-apart relative to one another, the second stator segment including a radially outer platform supporting a first stage of vanes and a second stage of vanes downstream of the first stage of vanes;
a first featherseal between the first circumferential end faces of the first and second stator segments; and
a second featherseal between the second circumferential end faces of the first and second stator segments.

8. The section as recited in claim 7, wherein the first featherseal is disposed in slots defined in the first circumferential end faces of the first and second stator segments.

9. The section as recited in claim 8, wherein the second featherseal is disposed in slots defined in the second circumferential end faces of the first and second stator segments.

10. The section as recited in claim 9, wherein longitudinal axes of the slots in which the first featherseal is disposed are defined at a first angle relative to an engine longitudinal axis of the gas turbine engine, and wherein the longitudinal axes of the slots in which the second featherseal is disposed are provided at a second angle relative to the engine longitudinal axis, the second angle greater than the first angle.

11. The section as recited in claim 9, wherein longitudinal axes of the slots in which the first featherseal is disposed are misaligned relative to longitudinal axes of the slots in which the second featherseal is disposed.

12. The section as recited in claim 7, wherein the radially outer platforms of the first and second stator segments each include a bleed slot formed therein.

13. The section as recited in claim 12, wherein the slots having the first featherseal disposed therein extend from a first axial end of the respective stator segment to the corresponding bleed slot.

14. The section as recited in claim 12, wherein the slots having the second featherseal disposed therein extend from a second axial end of the respective stator segment to the corresponding bleed slot.

15. The section as recited in claim 7, wherein the section is one of a compressor section and a turbine section.

16. The stator segment as recited in claim 7, wherein each first stage of vanes is axially aligned with a respective first circumferential end face and each second stage of vanes is axially aligned with a respective second circumferential end face.

17. A gas turbine engine, comprising:
a compressor section, a combustor section, and a turbine section; and
a stator segment provided within one of the compressor section and the turbine section, the stator segment including a radially outer platform supporting a first stage of vanes and a second stage of vanes spaced downstream of the first stage of vanes, the stator segment further including a first circumferential end face and a second circumferential end face, wherein the first and second circumferential end faces are misaligned and axially spaced-apart relative to one another.

18. The engine as recited in claim 17, wherein:
the first circumferential end face defines a first featherseal slot configured to receive a first featherseal; and
the second circumferential end face defines a second featherseal slot configured to receive a second featherseal.

19. The engine as recited in claim 17, wherein the first stage of vanes is axially aligned with the first circumferential end face and the second stage of vanes is axially aligned with the second circumferential end face.

* * * * *